April 3, 1951  D. E. HARRIS  2,547,390

ELECTROMAGNETICALLY OPERATED VALVE STRUCTURE

Filed March 4, 1949

INVENTOR.
DWIGHT E. HARRIS
BY Kenyon & Kenyon
ATTORNEYS

Patented Apr. 3, 1951

2,547,390

UNITED STATES PATENT OFFICE 2,547,390

ELECTROMAGNETICALLY OPERATED VALVE STRUCTURE

Dwight E. Harris, Stamford, Conn., assignor to The Skinner Chuck Company, Norwalk, Conn., a corporation of Connecticut Application March 4, 1949, Serial No. 79,550

10 Claims. (Cl. 137—139)

This invention relates to structures for electromagnetically operated fluid valves and has for its principal object the provision of an improved simplified structure which is particularly adaptable to rapid and convenient assembly such as would be particularly advantageous in quantity production.

It is a further object of the invention to provide a construction improved in one or more of the following respects: Effective fluid leakage prevention without the necessity of using parts requiring close manufacturing tolerances, brazed or welded joints, or adjustment of seals; and an improved magnetic circuit minimizing magnetic attraction of the magnet core in an undesired direction.

It is a still further object of the invention to provide such a valve which is particularly adaptable to use in systems, such as hydraulic brake systems of automotive vehicles, wherein it may be desired to control and build up hydraulic pressure within some element of the system, such as the element maintaining pressure on the brakes.

Figure 1:
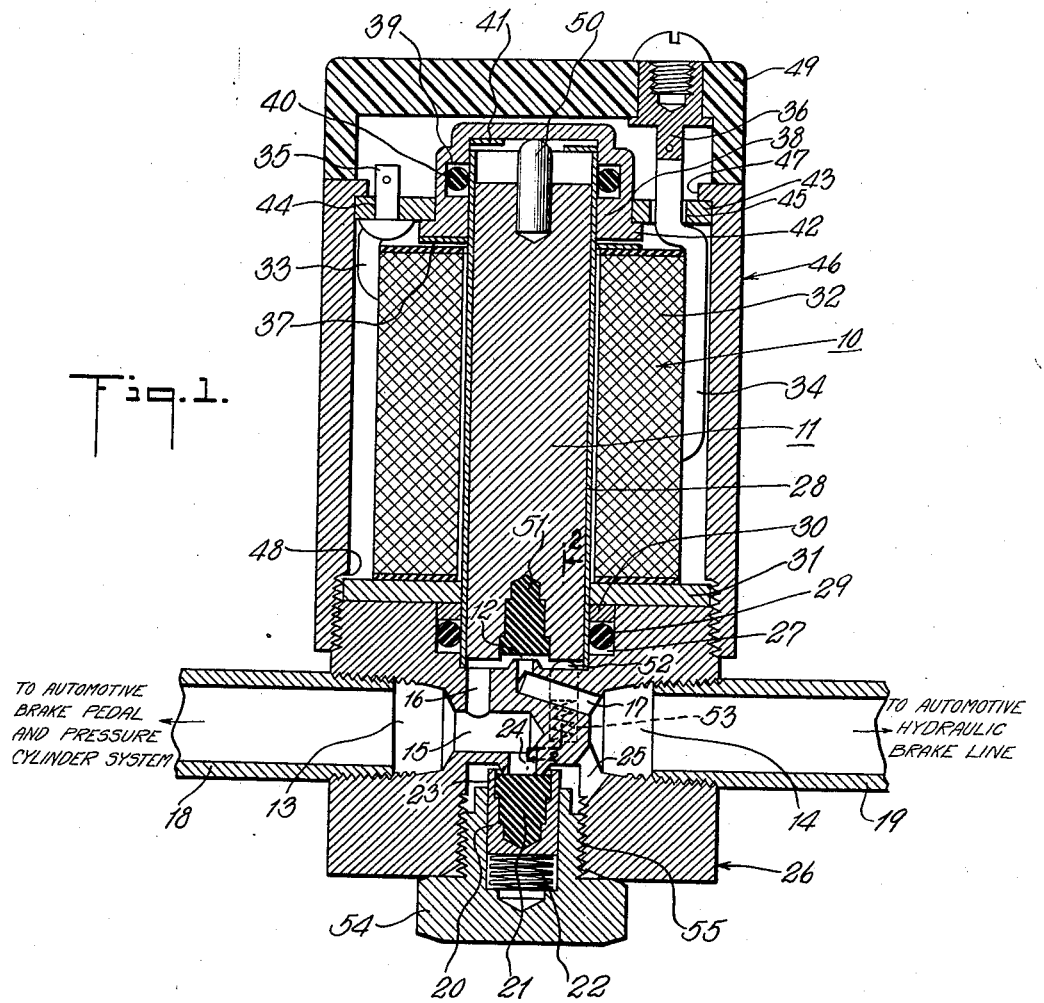
Figure 2:
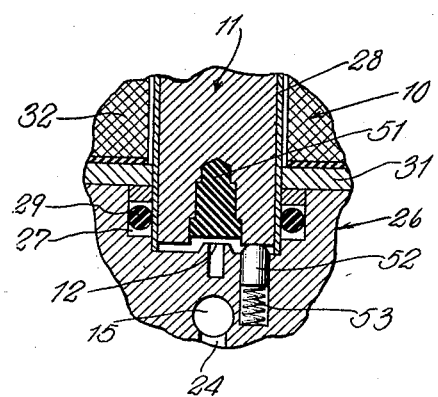

The features of the invention desired to be protected are set forth in the appended claims; the invention itself as together with further objects and the advantages thereof will best be understood by reference to the following specification when taken in connection with the accompanying drawing in which: the Fig. 1 is a cross sectional view of a valve embodying the invention; while the Fig. 2 is a partial cross section along the line 2—2 of Fig. 1.

Referring to the drawing, it will be apparent to those skilled in the art that the illustrated embodiment comprises generally an electromagnet 10 having a movable magnetic core 11 which is movable in its axial direction to close or open the valve seat 12. Thereby the flow of fluid from an inlet port 13 to an outlet port 14 through the ducts or channels 15, 16 and 17, or vice versa, may be controlled. For example, as one illustrative use, it may be considered that hydraulic pressure is built up in the inlet port 13 by the operation of an automotive brake pedal and pressure cylinder system (not shown) connected to the inlet port by tubing 18 and that it is desired to control the flow of fluid or transmission of pressure to an automotive hydraulic brake line (not shown) connected to the outlet port 14 by tubing 19. It is understood that it is desirable to build up and transmit pressure in such manner in an automotive brake system when the brakes are applied and also that pressure relieving reverse flow is desired when it is desired to release the brakes.

For the purpose of permitting additional increments of pressure in the brake line connected to the outlet port 14, while the valve seat 12 is closed and maintaining the original pressure, an auxiliary check valve may be provided. The latter may comprise the valve head 20 having the rubber sealing member 21, both biased by a spring 22 against the auxiliary valve seat 23. This structure will control the flow of fluid from the inlet port 13 through the ducts 24 and 25 into the outlet port 14 and thus to the brake line system. It will be apparent that when pressure exists in the brake line system and the valve seat 12 is closed, the auxiliary valve seat 23 will likewise normally remain closed by virtue of the biasing effect of the spring 22 and the pressure of the brake line system exerted on the lower end of the valve head 20 by fluid seeping into the space therebelow. Consequently, if, as by operation of the brake pedal, additional pressure be applied to the inlet port 13 over and above that existing at the outlet port 14 (plus the spring biasing force), an additional amount of fluid may flow from the inlet to the outlet port as the valve head 20 recedes under the force of the additional pressure. This check valve arrangement has the additional purpose and advantage that it permits more rapid actuation of the brake by permitting additional fluid flow through the auxiliary flow path of ducts 24 and 25 if the resistance of the main valve to rapid flow through it is great.

Coming now to further details of the structure illustrating one of the principal objects of the invention, the preferably cylindrical base 26, which is of magnetic material for the purpose of completing the magnetic circuit of the electromagnet, is provided with the cylindrical recess 27 at the bottom of which the valve seat 12 is positioned. Into this recess there projects the cylindrical non-magnetic sleeve 28 (e. g., brass) serving as a guide to the motion of the core 11. In order to seal the sleeve 28 with respect to the base 26 there may be provided the annular resilient ring 29, preferably of rubber or like material, and preferably having the circular cross section shown. Because of this construction it will be apparent that both the sleeve 28 and the ring 29 may be inserted into the position shown by placing the end of the sleeve with the ring thereon at the opening of the recess 27 and pushing that assembly downward whereupon the rolling action of the ring will permit easy assembly, Over the ring 29 there may be positioned the non-magnetic washer 30 of brass or like material for retaining ring 29 in position and thereafter a second and larger washer 31 likewise of non-magnetic material such as brass may be added for the purpose of preventing upward movement of ring 29 and washer 30 due to hydraulic pressure.

Surrounding the sleeve 28 is a conventional electromagnetic coil 32 which may be readily slipped over the sleeve 28 while its terminal leads 33 and 34 protrude for later connections to the output terminals 35 and 36 as indicated.

At the upper end of the coil 32 a suitable spring means, such as a wave type spring washer 37, may be provided for maintaining rigid contact or positioning between the coil 32 and the elements presently to be described. Positioned above this ring 37 and around the upper end of the non-magnetic sleeve 28 is a cylindrical cup or cap 38 of magnetic material having a cylindrical interior designed to mesh with the outer periphery of the sleeve 28. This cap serves to retain the coil 32 in position and also as part of the magnetic circuit of the electromagnet. The inner surface of the cup or cap 38 has an annular recess 39 within which there may be inserted a second annular ring 40 preferably of circular cross section and substantially the same as the ring 29 already described. Its purpose is similar, i. e., to provide a sealing between the sleeve 28 and the cap 38 and to facilitate assembly by rolling action. Further rigid and resilient connection between the cap 38 and the sleeve 28 may be provided by suitable spring means such as the resilient split spring ring 41.

Surrounding the cap 38 and resting on the annular flange 42 thereof is an annular washer 43 of magnetic material providing a rigid spacing between the cap 38 and the housing presently to be described and likewise forming part of the magnetic circuit. The washer 43 may be provided with suitable apertures 44 and 45 through which the leads or terminals of the coil 32 may protrude.

For the purpose of housing and securing the structure thus far described for the electromagnet to the base 26, the cylindrical housing 46 threadedly engaging the base 26 may be provided. This housing 46, which is of magnetic material in order to complete the magnetic circuit, is provided at its upper end with an inwardly protruding annular flange 47 which rigidly engages the washer 43; and, near its lower end, with a second annular flange or recess 48 which likewise engages and firmly holds the washer 31 against the base.

The ease and rapidity with which the foregoing structure may be assembled and applied to the base is readily apparent. For example, the magnetic sleeve 28 with its associated ring 29 and washers 30 and 31 may be very quickly affixed to the base 26 taking advantage of the rolling action of ring 29 as the sleeve and ring are inserted into recess 27, thereafter the electromagnetic coil structure may be quickly slipped over the sleeve, ring 37 added, and the ring 41 and cap 38 added by insertion over the upper end of the sleeve, taking advantage of the rolling action of the ring 40 as the cap is pushed down over the sleeve into position. Thereafter the washer 43 is added and the housing 46 simply slipped over the entire structure and screwed onto the base.

As a suitable external structure for positioning the terminal 36, the cap 49 of insulating material, such as a plastic, may be added and provided with the terminal to which the lead 34 is connected. The second lead 33 of the coil may be attached to the terminal 35 which in the illustration shown completes the circuits since it is electrically connected to the metallic housing 46 and the latter is normally grounded in automotive usage. If desired, of course, it may be passed through the washer 43 in an insulating manner and connected to a second terminal in the insulating cap 49.

Core 11 is so positioned that energization of the coil 32 will move it downward to close valve seat 12. When the coil is de-energized core 11 will move upward. In order to prevent its adherence to the upper magnetic structures, it may be provided, within a suitable hole in its upper end, with a plug 50 of non-magnetic material such as brass. The plug is of suitable length to maintain a suitable separation between the core 11 and the magnetic structure of the cap 38 thereby tending to prevent adherence of the core to the cap 38 when it should move downwardly. The core will thus more easily move downward into engagement with the valve seat 12 when the coil 32 is energized. This action is enhanced by the structure of cap 38 itself, for example, the presence of recess 39 minimizes magnetic forces which might tend to cause such adherence.

The core 11 is provided with a valve seat sealing member 51 of rubber or like material which engages the valve seat 12 and thereby closes the same. Normally the core 11 will be biased upwardly by the plunger 52 shown better in the Fig. 2. The plunger is biased upwardly by the spring 53 positioned within a recess within the base 26. Actuation or energization of the coil 32 will therefore draw the core 11 downward to engagement with the seat against the biasing force of spring 53. It will be understood, of course, that the arrangement may be suitably modified such that the core is in engagement with the seat in the non-energized rather than energized condition of the electromagnet in which case it will become a normally closed valve rather than normally open as illustrated.

The auxiliary valve head 20 is held in position by a removable plug 54 threadedly or otherwise secured within the recess 55 of the base 26. Thereby the auxiliary valve head may be conveniently removed for repair, cleaning or other necessity.

Numerous modifications of the foregoing embodiment will, of course, occur to those skilled in the art and all such that fall within the true spirit and scope of my invention I aim to include within the scope of the appended claims.

What I claim is:

1. A valve comprising a magnetic base having a recess therein, a valve seat within said recess, an electromagnet having a movable magnetic core, a valve head movable by said core for cooperation with said valve seat, a magnetic housing for said electromagnet affixed to said base, a non-magnetic sleeve surrounding said core and having one end thereof projecting into said recess, a spacer of resilient material between and frictionally engaging said sleeve and the wall of said recess, an electromagnetic coil surrounding said sleeve between the ends thereof, a magnetic retainer for said coil surrounding the other end of said sleeve, a spacer of resilient material between and frictionally engaging said sleeve and said retainer, and magetic means spacing said retainer and said housing.

2. A valve as in claim 1 including a member of non-magnetic material affixed to said core at the end thereof adjacent said retainer and so constructed and arranged as to space said core from said retainer.

3. A valve comprising a magnetic base having a recess therein, a valve seat within said recess, an electromagnet having a movable magnetic core, a valve head movable by said core for cooperation with said valve seat, a magnetic housing for said electromagnet affixed to said base, a non-magnetic sleeve surrounding said core and having one end thereof projecting into said recess, a ring of resilient material and circular cross section between and frictionally engaging said sleeve and the wall of said recess, an electromagnetic coil surrounding said sleeve between the ends thereof, a magnetic retainer for said coil surrounding the other end of said sleeve, a ring of resilient material and circular cross section between and frictionally engaging said sleeve and said retainer, and magnetic means spacing said retainer and said housing.

4. A valve as in claim 3 including a member of non-magnetic material affixed to said core at the end thereof adjacent said retainer and so constructed and arranged as to space said core from said retainer.

5. A valve comprising a magnetic base having a cylindrical recess therein, a valve seat within said recess, an electromagnet having a movable cylindrical magnetic core, a valve head affixed to one end of said core for cooperation with said valve seat, a cylindrical magnetic housing for said electromagnet affixed to said base, a non-magnetic cylindrical sleeve surrounding said core and having one end thereof projecting into said recess, a ring of resilient material and circular cross section between and frictionally engaging said sleeve and the wall of said recess, an electromagnetic coil surrounding said sleeve between the ends thereof, a cylindrical retaining cap of magnetic material for said coil surrounding the other end of said sleeve, a ring of resilient material and circular cross section between and frictionally engaging said sleeve and said cap, and a ring of magnetic material spacing said cap and said housing.

6. A valve as in claim 5 including a plug of non-magnetic material affixed to said core at the other end thereof and so constructed and arranged as to space said core from said cap.

7. A valve comprising a magnetic base having a cylindrical recess therein, a valve seat within said recess, an electromagnet having a movable cylindrical magnetic core one end of which is positioned for reciprocation in said recess, a valve head affixed to said one end of said core for cooperation with said valve seat, a cylindrical magnetic housing for said electromagnet affixed to said base, a non-magnetic cylindrical sleeve surrounding said core and having one end thereof projecting into said recess, a ring of resilient material and circular cross section between and frictionally engaging said sleeve and the wall of said recess, a washer surrounding said sleeve and retaining said ring within said recess, said housing having an annular flange retaining said washer against said base, an electromagnetic coil surrounding said sleeve between the ends thereof, a cylindrical retaining cap of magnetic material for said coil surrounding the other end of said sleeve and having an annular flange on the outer surface thereof, a ring of resilient material and circular cross section between and frictionally engaging said sleeve and said cap, and a ring of magnetic material on the said annular flange of said cap spacing said cap and said housing, said housing having an annular flange engaging said last-mentioned ring.

8. A valve as in claim 7 including spring means normally biasing said core toward said cap when said coil is de-energized whereby said valve head is separated from said valve seat, said electromagnet being so constructed that said core moves against said spring to engage said valve head and seat when said coil is energized, and a plug of non-magnetic material affixed to said core at the other end thereof and so constructed and arranged as to space said core from said cap whereby to prevent magnetic adherence thereto.

9. A valve comprising a magnetic base having a cylindrical recess therein, a valve seat within the bottom of said recess, an electromagnet having a movable cylindrical magnetic core one end of which is positioned for reciprocation in said recess, a valve head affixed to said one end of said core for cooperation with said valve seat, a cylindrical magnetic housing for said electromagnet affixed to said base, a non-magnetic cylindrical sleeve surrounding said core and having one end thereof projecting into said recess, a ring of resilient material and circular cross section between and frictionally engaging said sleeve and the wall of said recess, a washer surrounding said sleeve and retaining said ring within said recess, said housing having an annular flange retaining said washer against said base, an electromagnetic coil surrounding said sleeve between the ends thereof, a cylindrical retaining cap of magnetic material for said coil surrounding the other end of said sleeve and having an annular flange on the outer surface thereof, a ring of resilient material and circular cross section between and frictionally engaging said sleeve and said cap, and a ring of magnetic material engaging said annular flange of said cap on the side thereof away from said base and spacing said cap and said housing, said housing having an inwardly projecting annular flange having a side toward said base engaging said last-mentioned ring whereby said housing, said last-mentioned ring and said cap hold said sleeve and coil firmly in the positions aforesaid between said base and cap.

10. A valve as in claim 9 including spring means normally biasing said core toward said cap when said coil is deenergized whereby said valve head is separated from said valve seat, said electromagnet being so constructed that said core moves against said spring to engage said valve head and seat when said coil is energized, and a plug of non-magnetic material affixed to said core at the other end thereof and so constructed and arranged as to space said core from said cap whereby to prevent magnetic adherence thereto.

DWIGHT E. HARRIS.

REFERENCES CITED

The following references are of record in the file of this patent:

UNITED STATES PATENTS

| Number | Name | Date |
|---|---|---|
| Re. 21,602 | Darling | Oct. 22, 1940 |
| 1,389,056 | Lane | Aug. 30, 1921 |
| 1,978,737 | Bower | Oct. 30, 1934 |
| 2,353,835 | Lane | July 18, 1944 |
| 2,394,105 | Rice | Feb. 5, 1946 |